(12) United States Patent
Moore (10) Patent No.: US 7,476,039 B2
(45) Date of Patent: Jan. 13, 2009

(54) OPTICAL SUBASSEMBLY POSITIONING DEVICE FOR AN ELECTRONIC MODULE

(75) Inventor: Joshua Moore, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 12/038,784

(22) Filed: Feb. 27, 2008

(65) Prior Publication Data

US 2008/0205895 A1 Aug. 28, 2008

Related U.S. Application Data

(60) Provisional application No. 60/892,199, filed on Feb. 28, 2007.

(51) Int. Cl.
*G02B 6/42* (2006.01)

(52) U.S. Cl. .......................................... 385/92

(58) Field of Classification Search ........................ None
See application file for complete search history.

(56) References Cited

U.S. PATENT DOCUMENTS

| 6,744,639 | B1* | 6/2004 | Branch et al. ................ 361/818 |
| 2003/0171022 | A1* | 9/2003 | Distad et al. ................ 439/372 |
| 2004/0151443 | A1* | 8/2004 | Mizue .......................... 385/92 |
| 2006/0140552 | A1* | 6/2006 | Mizue et al. .................. 385/92 |
| 2006/0215970 | A1* | 9/2006 | Mizue et al. .................. 385/92 |
| 2007/0189673 | A1* | 8/2007 | Yoshikawa ................... 385/53 |
| 2007/0237466 | A1* | 10/2007 | Togami et al. ................. 385/92 |

OTHER PUBLICATIONS

Moore, Joshua et al., Collar Clip for an Electronic Module, U.S. Appl. No. 12/038,689, filed Feb. 27, 2008.
Moore, Joshua et al., Positioning Plate for Optical Subassembly, U.S. Appl. No. 12/039,598, filed Feb. 28, 2008.
Moore, Joshua et al., Rotatable Top Shell, U.S. Appl. No. 12/039,677, filed Feb. 28, 2008.
Moore, Joshua et al, Printed Circuit Board Positioning Mechanism, U.S. Appl. No. 12/038,708, filed Feb. 27, 2008.
Moore, Joshua, Angular Seam for an Electronic Module, U.S. Appl. No. 12/038,721, filed Feb. 27, 2008.

* cited by examiner

*Primary Examiner*—Sung H Pak
*Assistant Examiner*—Mike Stahl
(74) *Attorney, Agent, or Firm*—Workman Nydegger (57) ABSTRACT

In one example embodiment, an optical subassembly (OSA) positioning device includes a front piece, a top back piece, and a top connector piece connecting the front piece and the top back piece, a bottom back piece, and a bottom connector piece connecting the from piece and the bottom back piece. The front piece defines a first port. The first port is configured to receive and substantially secure a first OSA in an x-axis position and a y-axis position when the OSA positioning device is positioned within an optoelectronic module. The top and bottom connector pieces are deformable in response to an exerted force so as to bias a flange of the first OSA against a shell of the optoelectronic module such that the first OSA is secured in a z-axis position when the OSA positioning device is positioned within the optoelectronic module.

20 Claims, 7 Drawing Sheets

OPTICAL SUBASSEMBLY POSITIONING DEVICE FOR AN ELECTRONIC MODULE

CROSS REFERENCE TO A RELATED APPLICATION

The present application claims priority to U.S. Provisional Patent Application Ser. No. 60/892,199, filed Feb. 28, 2007 and entitled "Electronic Module Mechanical Systems," which is incorporated herein by reference in its entirety.

BACKGROUND

Electronic modules, such as electronic or optoelectronic transceiver or transponder modules, are increasingly used in electronic and optoelectronic communication. Electronic modules typically communicate with a printed circuit board of a host device by transmitting electrical signals to the printed circuit board and receiving electrical signals from the printed circuit board. These electrical signals can then be transmitted by the electronic module outside the host device as optical and/or electrical signals.

One common difficulty associated with the operation of electronic modules is the generation of electromagnetic radiation. The generation of electromagnetic radiation by an electronic module is a matter of significant concern because such electromagnetic radiation can cause electromagnetic interference (EMI) with other systems and devices in the vicinity, which can seriously impair, if not prevent, the proper operation of those other systems and devices. Thus, the control of EMI effects is an important consideration in the design and use of electronic modules.

Another common difficulty associated with some electronic modules concerns the assembly of the modules. For example, an electronic module generally includes various components that must be secured within the module. Due to limitations in size and space, it can be difficult to secure components accurately and reliably within an electronic module.

Yet another challenge associated with many electronic modules concerns the establishment and maintenance of accurate optical alignment between various optical and/or optoelectronic components. Where optical components within an electronic module are not accurately aligned, optical signals traveling between the optical components may experience interference. This interference can impair the proper operation of the electronic module. Likewise, if the optical components are misaligned with respect to corresponding input ports and/or output ports of an electronic module, the plugability of optical connectors can be impaired, resulting in hard plug. Hard plug is a condition where the force required to insert or remove an optical connector from an import port or an output port is uncomfortably high. This creates an undesirable user experience and in some cases can damage the electronic module and/or the optical connectors.

SUMMARY OF SOME EXAMPLE EMBODIMENTS

In general, example embodiments disclosed herein relate to an optical subassembly (OSA) positioning device for use in an electronic module. Some example embodiments of the OSA positioning device disclosed herein can help secure a transmitter optical subassembly (TOSA) and/or a receiver optical subassembly (ROSA) in accurate x, y, and z optical alignment with an output port and an input port, respectively, of an electronic module.

In one example embodiment, an OSA positioning device includes a front piece, a top back piece, and a top connector piece connecting the front piece and the top back piece, a bottom back piece, and a bottom connector piece connecting the front piece and the bottom back piece. The front piece defines a first port. The first port is configured to receive and substantially secure a first OSA in an x-axis position and a y-axis position when the OSA positioning device is positioned within an optoelectronic module. The top and bottom connector pieces are deformable in response to an exerted force so as to bias a flange of the first OSA against a shell of the optoelectronic module such that the first OSA is secured in a z-axis position when the OSA positioning device is positioned within the optoelectronic module.

In another example embodiment, an OSA positioning device includes a front piece, a top back piece, a top connector piece connecting the front piece and the top back piece, a bottom back piece, and a bottom connector piece connecting the front piece and the bottom back piece. The front piece defines a TOSA port and a ROSA port. The TOSA port is configured to receive and substantially secure a TOSA in an x-axis position and a y-axis position when the OSA positioning device is positioned within an optoelectronic transceiver module. The ROSA port is configured to receive and substantially secure a ROSA in an x-axis position and a y-axis position when the OSA positioning device is positioned within the optoelectronic transceiver module. The top connector piece is deformable so as to bias a flange of the TOSA and a flange of the ROSA against a shell of the optoelectronic module such that the TOSA and the ROSA are secured in a z-axis position when the OSA positioning device is positioned within the optoelectronic transceiver module.

In yet another example embodiment, an optoelectronic transceiver module includes a shell. The shell includes a top shell and a bottom shell. The top shell defines a rib. The bottom shell defines a slot. At least one of the top shell and/or the bottom shell defines a crimping rib. The optoelectronic transceiver module also includes a printed circuit board (PCB) at least partially positioned within the shell, a TOSA electrically connected to the PCB, and a ROSA electrically connected to the PCB. The TOSA defines a TOSA flange and the ROSA defines a ROSA flange. The optoelectronic transceiver module further includes an OSA positioning device at least partially positioned within the slot. The OSA positioning device includes a front piece, a top back piece, and a top connector piece connecting the front piece and the top back piece, a bottom back piece, and a bottom connector piece connecting the front piece and the bottom back piece. The front piece defines a TOSA port and a ROSA port. The TOSA port substantially secures the TOSA in an x-axis position and a y-axis position within the shell. The ROSA port substantially secures the ROSA in an x-axis position and a y-axis position within the shell. At least one of the top connector piece or the bottom connector piece has a crimped portion associated with the crimping rib, the crimped portion serving to bias the TOSA flange and the ROSA flange against the shell such that the TOSA and the ROSA are secured in a z-axis position within the shell.

These and other aspects of example embodiments will become more fully apparent from the following description and appended claims.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION OF EXAMPLE EMBODIMENTS

Example embodiments disclosed herein relate to an optical subassembly (OSA) positioning device for use in an electronic module. Some example embodiments of the OSA positioning device disclosed herein can help secure a transmitter optical subassembly (TOSA) and a receiver optical subassembly (ROSA) in accurate x, y, and z optical alignment with an output port and an input port, respectively, of an electronic module. In addition, example OSA positioning devices disclosed herein can help solve problems associated with gaps created as a result of manufacturing tolerances and stacking tolerances of an electronic modules, such as a shell of the electronic module, the TOSA, and the ROSA, for example. Further, as the electronic module is vibrated during assembly and use, some OSA positioning devices disclosed herein can help dampen the vibration, and thereby help to maintain the TOSA and the ROSA in an accurate x, y, and z optical alignment with the output port and the input port, respectively. Moreover, the example OSA positioning devices disclosed herein can compensate for thermally-induced effects such as expansion/contraction of electronic module components.

Reference will now be made to the drawings to describe various aspects of some example embodiments. It is to be understood that the drawings are diagrammatic and schematic representations of such example embodiments, and are not limiting, nor are they necessarily drawn to scale.

1. Example Optoelectronic Transceiver Module

Figure 1A:
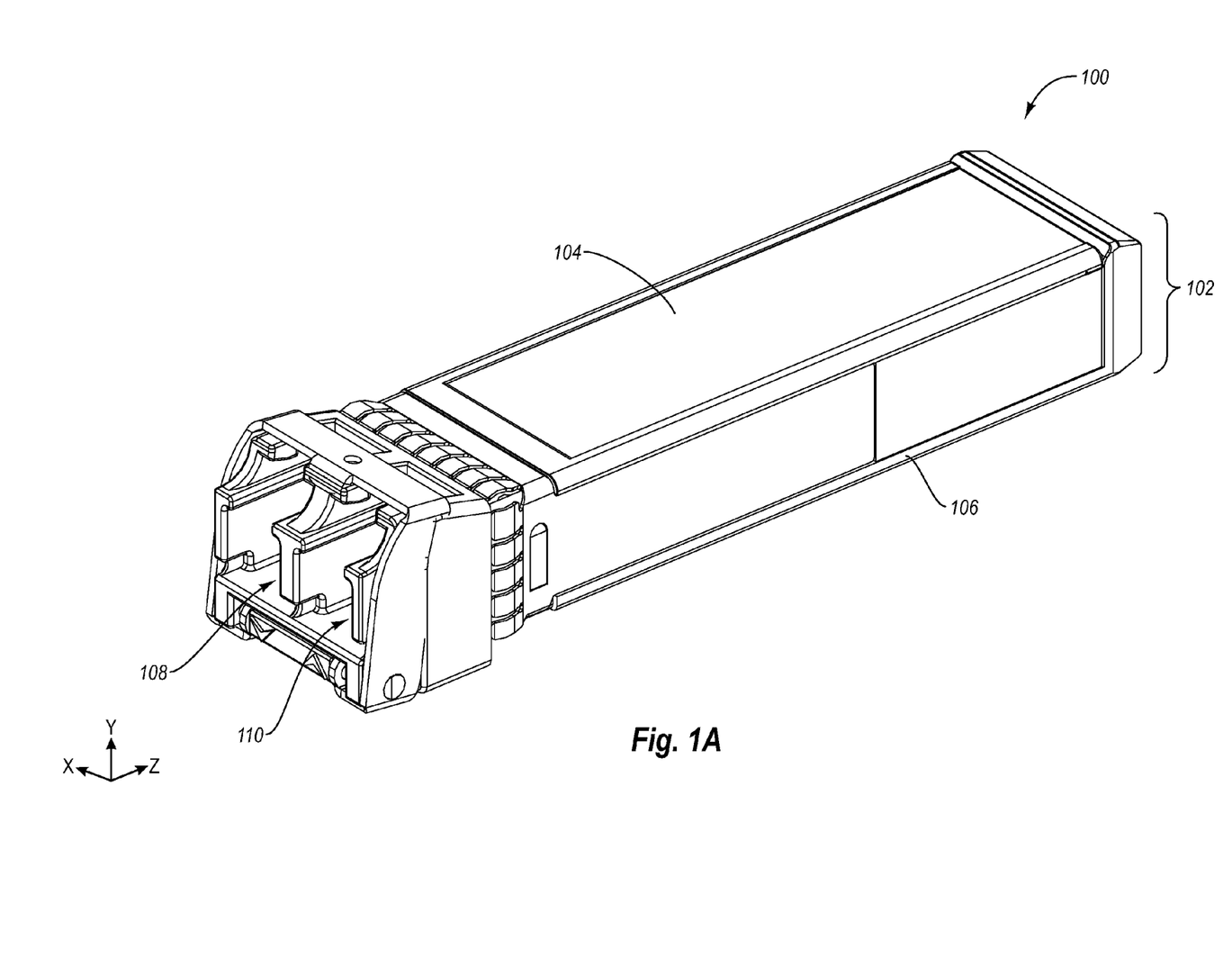
FIG. 1A is a top perspective view of an example optoelectronic transceiver module.
Figure 1B:
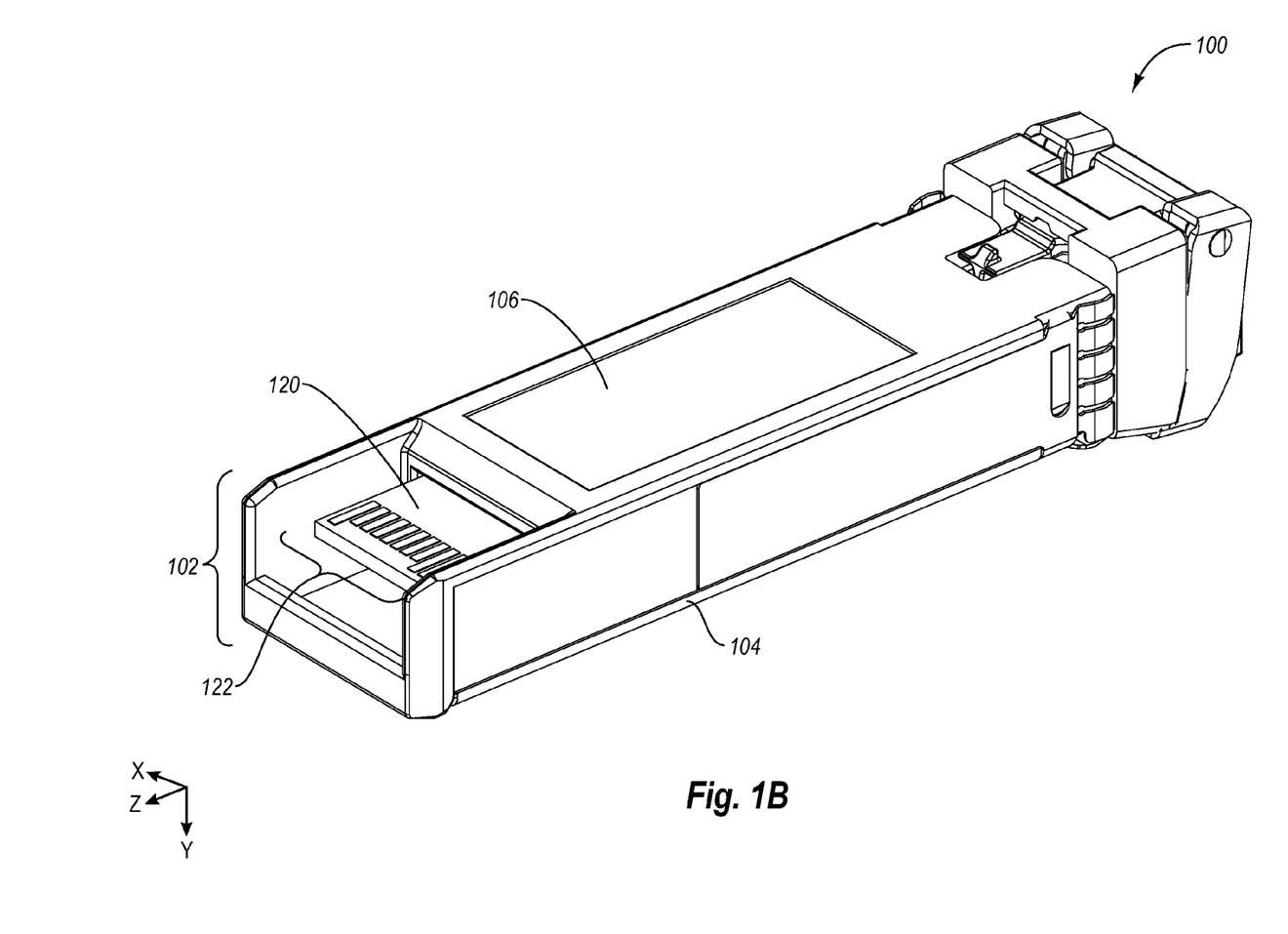
FIG. 1B is a bottom perspective view of the example optoelectronic transceiver module of FIG. 1A.
Figure 1C:
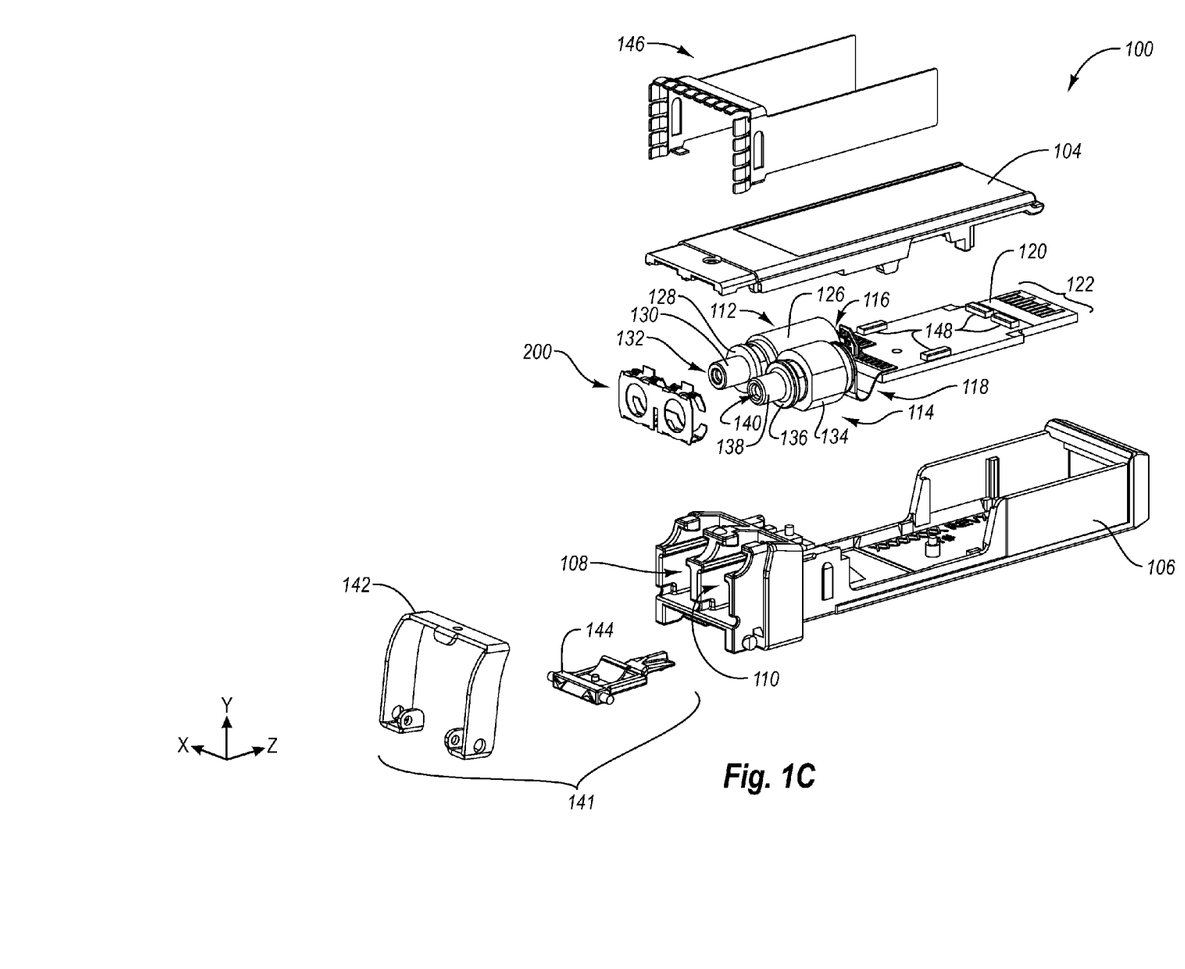
FIG. 1C is an exploded perspective view of the example optoelectronic transceiver module of FIG. 1A.

Reference is first made to FIGS. 1A-1C which disclose aspects of an example optoelectronic transceiver module 100 for use in transmitting and receiving optical signals in connection with a host device (not shown). As disclosed in FIGS. 1A and 1B, the optoelectronic transceiver module 100 includes various components, including a shell 102 that includes a rotatable top shell 104 and a bottom shell 106. The rotatable top shell 104 is rotatable with respect to the bottom shell 106. An output port 108 and an input port 110 are defined in the bottom shell 106. The rotatable top shell 104 and the bottom shell 106 can be formed using a die casting process, machining operation, or any other suitable process(es). One example material from which the rotatable top shell 104 and the bottom shell 106 can be die cast is zinc, although the rotatable top shell 104 and the bottom shell 106 may alternatively be die cast or otherwise constructed from other suitable materials such as aluminum, or any other suitable material(s).

As disclosed in FIG. 1C, the example optoelectronic transceiver module 100 also includes a transmitter optical subassembly (TOSA) 112, a receiver optical subassembly (ROSA) 114, electrical interfaces 116 and 118, and a printed circuit board (PCB) 120 having an edge connector 122. The two electrical interfaces 116 and 118 are used to electrically connect the TOSA 112 and the ROSA 114, respectively, to the PCB 120.

The TOSA 112 of the optoelectronic transceiver module 100 includes a barrel 126 within which an optical transmitter, such as a laser, (not shown) is disposed. The optical transmitter is configured to convert electrical signals received through the PCB 120 from a host device (not shown) into corresponding optical signals. The TOSA 112 also includes a flange 128 and a nose piece 130. The nose piece 130 defines a port 132. The port 132 is configured to optically connect the optical transmitter disposed within the barrel 126 with a fiber-ferrule (not shown) disposed within the output port 108.

Similarly, the ROSA 114 of the optoelectronic transceiver module 100 includes a barrel 134, a flange 136, and a nose piece 138. The nose piece 138 defines a port 140. The port 140 is configured to optically connect an optical receiver, such as a photodiode (not shown), disposed within the barrel 134 to a fiber-ferrule (not shown) disposed within the input port 110. The optical receiver is configured to convert optical signals received from the fiber-ferrule into corresponding electrical signals for transmission to a host device (not shown) through the PCB 120.

The optoelectronic transceiver module 100 can be configured for optical signal transmission and reception at a variety of per-second data rates including, but not limited to, 1 Gbit, 2 Gbit, 2.5 Gbit, 4 Gbit, 8 Gbit, 10 Gbit, 17 Gbit, 40 Gbit, 100 Gbit, or higher. Furthermore, the optoelectronic transceiver module 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the optoelectronic transceiver module 100 can be configured to support various communication standards including, but not limited to, Fast Ethernet, Gigabit Ethernet, 10 Gigabit Ethernet, and 1x, 2x, 4x, and 10Fibre Channel. In addition, although one example of the optoelectronic transceiver module 100 is configured to have a form factor that is substantially compliant with the SFP+ (IPF) MSA, the optoelectronic transceiver module 100 can alternatively be configured to have a variety of different form factors that are substantially compliant with other MSAs including, but not limited to, the SFF MSA or the SFP MSA.

With continued reference to FIG. 1C, the optoelectronic transceiver module 100 also includes a latching mechanism 141 which includes a bail 142 and a latch 144. The optoelectronic transceiver module 100 further includes a collar clip 146, four PCB positioning mechanisms 148, and an optical subassembly (OSA) positioning device 200. Aspects of the example OSA positioning device 200 disclosed in FIG. 1C will be discussed in greater detail below in connection with FIGS. 2A-2D.

2. Example OSA Positioning Device

With reference now to FIGS. 2A-2D, aspects of an example OSA positioning device 200 are disclosed. The example OSA positioning device 200 can be formed from any suitable material including, but not limited to, 301 or 302 stainless steel sheet metal. The material used in the construction of the OSA positioning device 200 can also have various thicknesses and may be substantially flat.

Figure 2A:
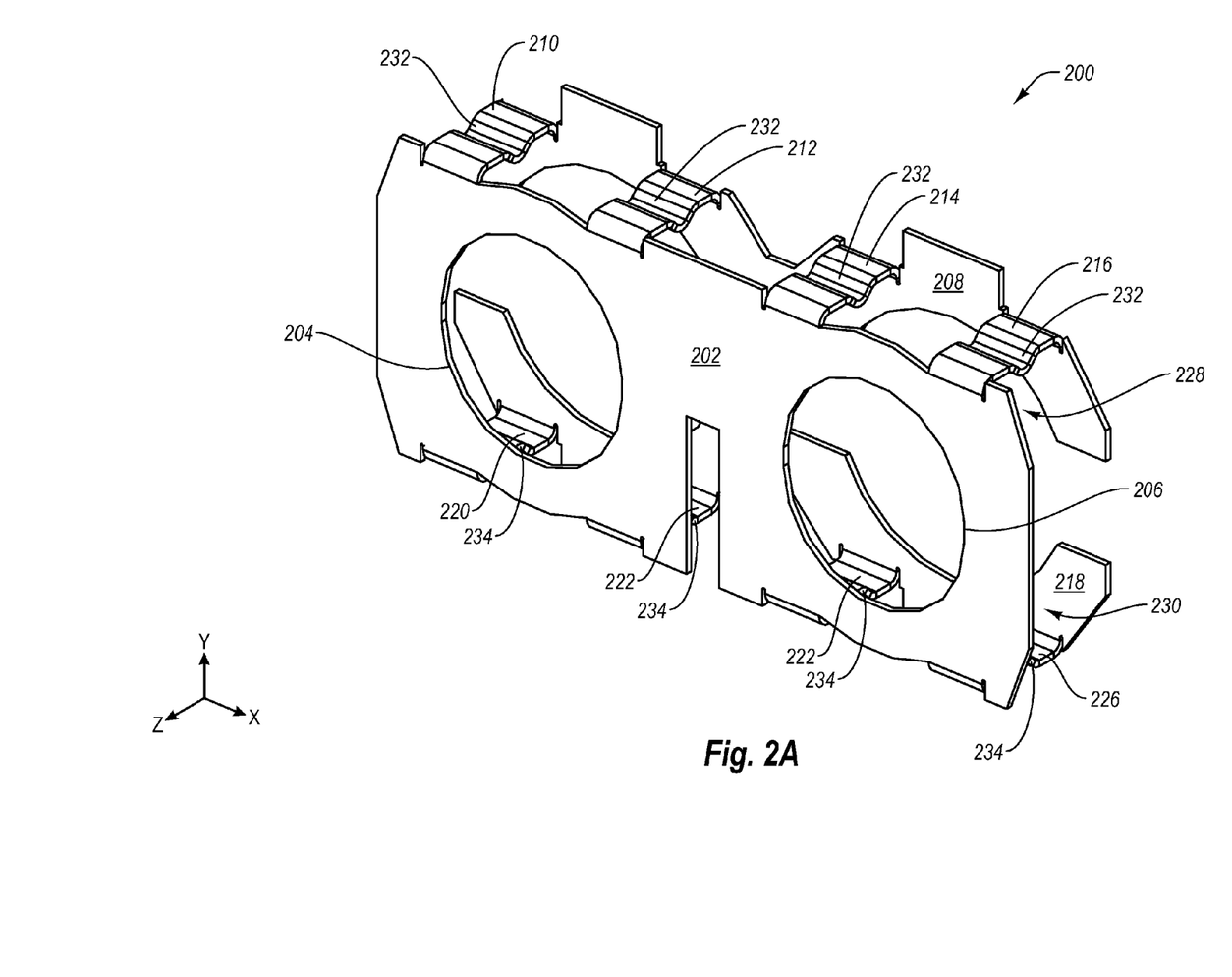
FIG. 2A is a perspective view of an example OSA positioning device.

As disclosed in FIG. 2A, the example OSA positioning device 200 includes a front piece 202, a first port 204 defined through the front piece 202, a second port 206 defined in the front piece 202, a top back piece 208, a plurality of top connector pieces 210-216 connecting the front piece 202 and the top back piece 208, a bottom back piece 218, and a plurality of bottom connector pieces 220-226 connecting the front piece 202 and the bottom back piece 218. In some example embodiments, the front piece 202, the top back piece 208, and the bottom back piece 218 are all substantially parallel to each other. The OSA positioning device 200 also defines a top gap 228 and a bottom gap 230. The top gap 228 is defined between the front piece 202 and the top back piece 208. The bottom gap 230 is defined between the front piece 202 and the bottom back piece 218. The gaps 228 and 230 will be discussed in greater detail below in connection with FIG. 2C.

With continued reference to FIG. 2A, although the top connector pieces 210-216 are disclosed as having a crimp 232, and the bottom connector pieces 220-226 are disclosed as having a crimp 234, it is noted that the crimps 232 and 234 may not be formed in the OSA positioning device 200 until after the OSA positioning device 200 is assembled into the optoelectronic transceiver module 100. For example, ribs formed on the underside of the top shell 104 and the upperside of the bottom shell 106 (see ribs 158 and 160 disclosed in FIG. 2D) may crimp the connector pieces 210-216 and 220-226 as the top shell 104 is rotated downward and attached to the bottom shell 106. Alternatively, the connector pieces 210-216 and 220-226 can be crimped using a crimping tool (not shown) in order to secure the TOSA 112 and the ROSA 114 to the bottom shell 106 of the optoelectronic transceiver module 100. It is also understood that only one of the sets of connector pieces 210-216 or 220-226 may be crimped.

In addition, it is understood that in some example embodiments, the OSA positioning device 200 may include only one port, only one top connector piece, and/or only one bottom connector piece. Including only one port may allow the OSA positioning device 200 to be employed in an optoelectronic module with only one OSA, or may allow multiple OSAs within an optoelectronic device to be positioned and secured independently of one another.

Moreover, the example OSA positioning device 200 is not limited to use with OSAs, but can alternatively or additionally be employed in connection with other components in which the positioning functionality of the OSA positioning 200 would be useful.

Further, in some example embodiments, the OSA positioning device may include only the top back piece and the top connector piece(s), or alternatively only include the bottom back piece and the bottom connector piece(s).

Figure 2B:
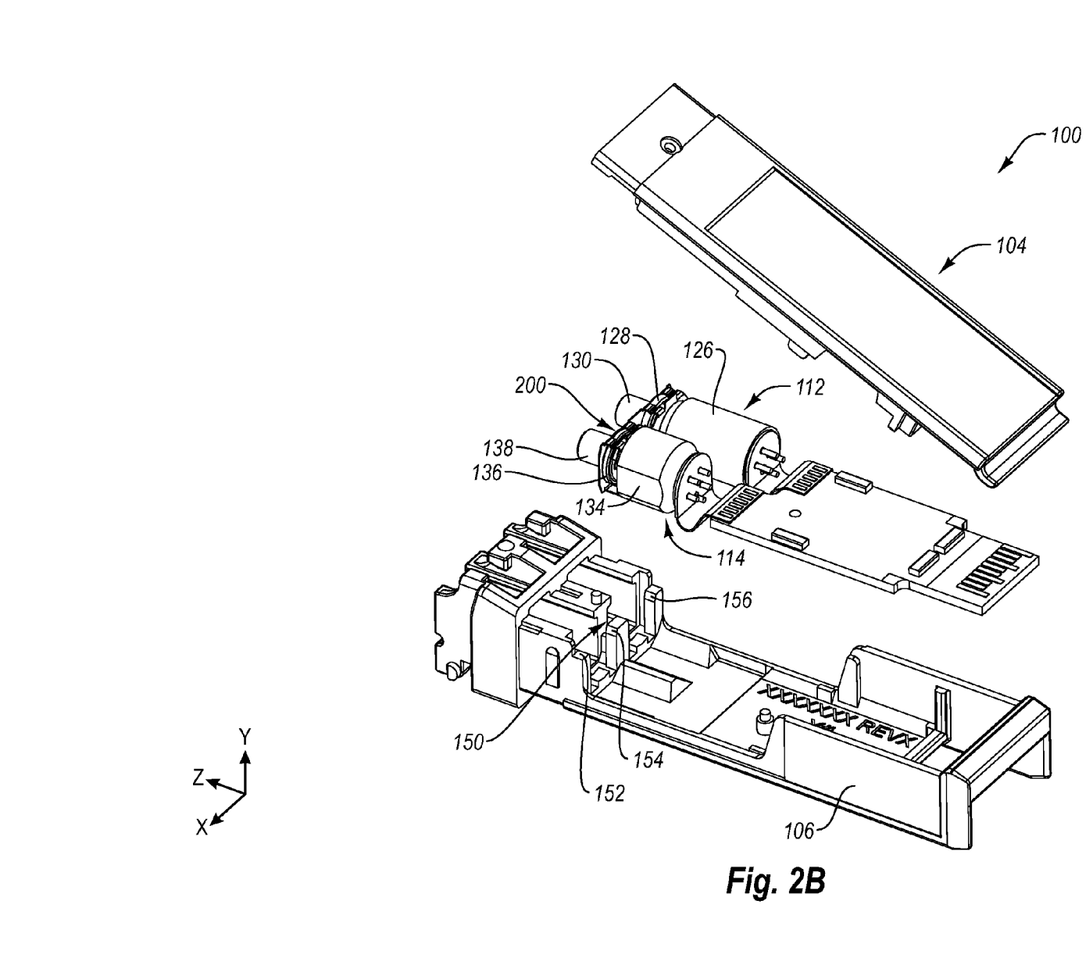
FIG. 2B is an exploded rear perspective view of the example OSA positioning device of FIG. 2A positioned over the nosepieces of an example TOSA and an example ROSA.

With continuing reference to FIG. 2A, and with reference now also to FIG. 2B, additional details regarding the OSA positioning device 200 are disclosed. In particular, FIG. 2B discloses the OSA positioning device 200 positioned around flanges 128 and 136 and nose pieces 130 and 138 of the TOSA 112 and the ROSA 114, respectively. Also disclosed in FIG. 2B is a slot 150 defined in the bottom shell 106. The slot 150 is configured to receive the front piece 202 of the OSA positioning device 200 and the flanges 128 and 136 after the OSA positioning device 200 has been positioned over the nose pieces 130 and 138 of the TOSA 112 and the ROSA 114, respectively. The back side of the slot 150 is formed from posts 152-156 defined in the bottom shell 106.

Figure 2C:
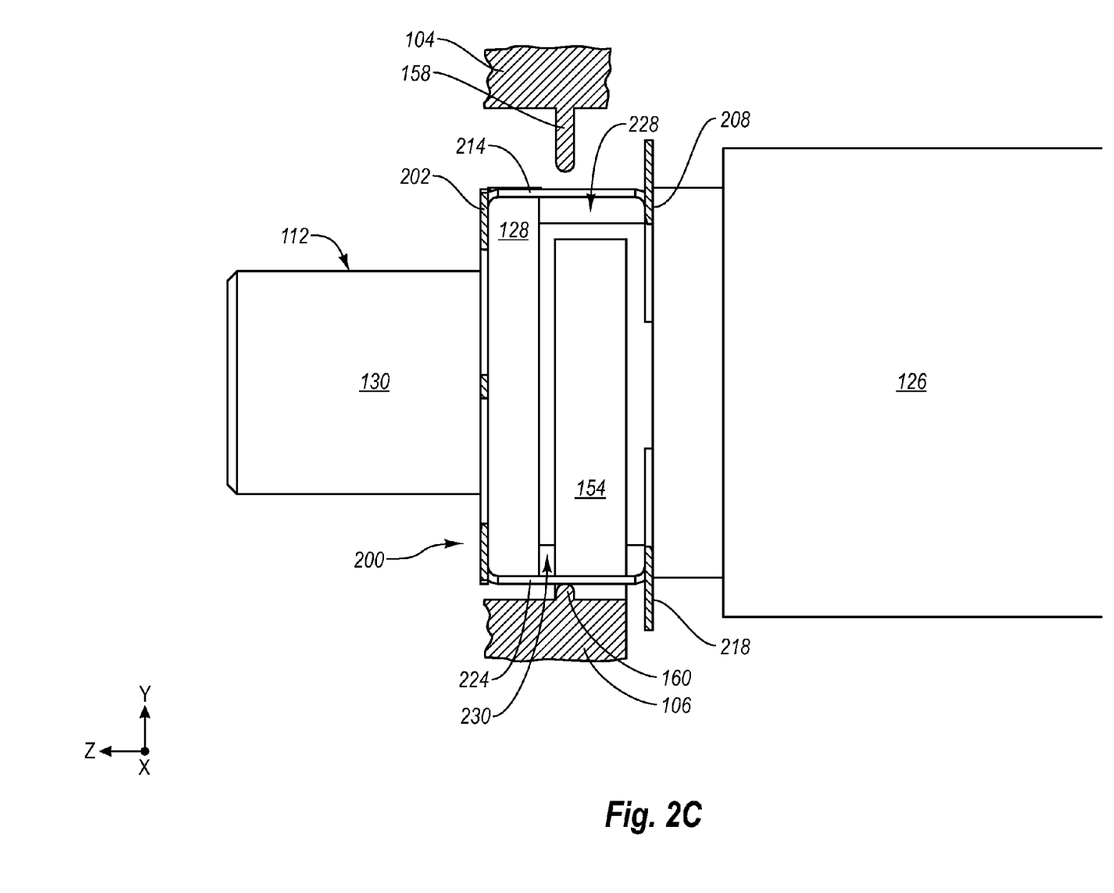
FIG. 2C is a partial cross-sectional side view of the example OSA positioning device of FIG. 2A positioned over the nosepiece of the example TOSA of FIG. 2B, where the example OSA positioning device is shown in an uncompressed state.
Figure 2D:
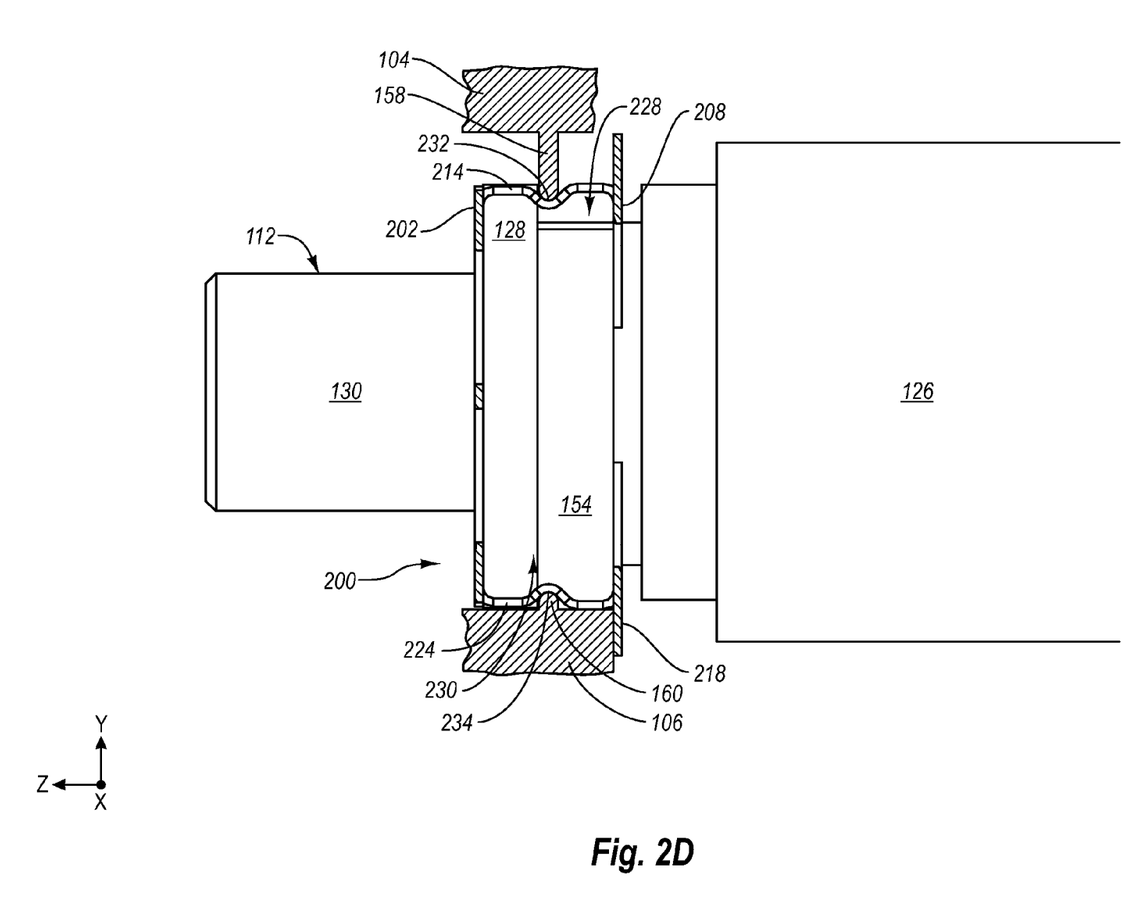
FIG. 2D is a partial cross-sectional side view of the example OSA positioning device of FIG. 2A positioned over the nosepiece of the example TOSA of FIG. 2B, where the example OSA positioning device is shown in a compressed state.

During the assembly of the optoelectronic transceiver module 100, and with reference to FIGS. 2C and 2D, the OSA positioning device 200 is positioned around flanges 128 and 136 and nose pieces 130 and 138 of the TOSA 112 and the ROSA 114, respectively, as disclosed in FIG. 2B. Next, the OSA positioning device 200, the TOSA 112, the ROSA 114 are simultaneously positioned within the bottom shell 106 of the optoelectronic transceiver module 100. As the OSA positioning device 200 is being positioned within the slot 150, the posts 152-156 become positioned within the gaps 228 and 230 of the OSA positioning device 200.

With particular reference now to FIG. 2C, a side view of the OSA positioning device 200 is disclosed after having been positioned in the bottom shell 106 of the optoelectronic transceiver module 100. In particular, FIG. 2C discloses the OSA positioning device 200 before the top connector pieces 210-216 (only the top connector piece 214 is shown in FIG. 2C) and the bottom connector pieces 220-226 (only the bottom connector piece 224 is shown in FIG. 2C) have been crimped by ribs 158 and 160, respectively. As disclosed in FIG. 2C, the rib 158 is formed on the underside of the top shell 104 and the rib 160 is formed on the upperside of the bottom shell 106. FIG. 2C also discloses the TOSA 112 positioned in the OSA positioning device 200, and the posts 152-156 (only the post 154 is shown in FIG. 2C) positioned in the gaps 228 and 230. As discussed above, the gap 228 is defined between the front piece 202 and the top back piece 208 and the gap 230 is defined between the front piece 202 and the bottom back piece 218.

With reference now to FIG. 2D, a side view of the OSA positioning device 200 of FIG. 2C is disclosed after having the top connector pieces 210-216 (only the top connector piece 214 is shown in FIG. 2D) and the bottom connector pieces 220-226 (only the bottom connector piece 224 is shown in FIG. 2D) crimped to form the crimps 232 and 234, respectively.

The crimps 232 and 234 can be formed by the ribs 158 and 160, respectively. For example, the rib 158 can be configured to make contact with the top connector pieces 210-216 and to exert a force so as to form the crimp 232 on the top connector pieces 210-216 as the rotatable top shell 104 is rotated downward to a closed position. Simultaneously, the force exerted by the rib 158 as the rotatable top shell 104 is rotated downward can also cause the OSA positioning device 200 to be forced downward against the rib 160, forming the crimp 234 in the bottom connector pieces 220-226.

It is noted that the ribs 158 and 160 can function in an embodiment of the top shell 104 that is not rotatable. For example, the top shell 104 may be configured to close against the bottom shell 106 without rotating about the bottom shell 106. Instead, the top shell 104 may be configured to mate with the bottom shell 106 by pushing the top shell 104 directly down onto the bottom shell 106. Various mating configurations can be employed while still allowing the ribs 158 and 160 to cause the crimps 232 and 234, respectively. Also, as discussed above, in some example embodiments, the crimps 232 and 234 can be formed using a crimp tool (not shown) or other crimping method.

Formation of the crimp 232 in the top connector pieces 210-216 shrinks the z-distance between the front piece 202 and the top back piece 208 by pulling the top back piece 208 closer to the front piece 202. Similarly, the formation of the crimp 234 in the bottom connector pieces 220-226 shrinks the z-distance between the front piece 202 and the bottom back piece 218 by pulling the bottom back piece 218 closer to the font piece 202. This shrinking biases the flange 128 of the TOSA 112 and the flange 136 of the ROSA 114 against the posts 152-156 defined in the bottom shell 106 of the optoelectronic transceiver module 100. This biasing effect secures the TOSA 112 and the ROSA 114 in a z-axis position within the optoelectronic transceiver module 100. The term "secured in a z-axis position within the optoelectronic transceiver module" as used herein refers to a component being substantially secured from motion along the z-axis within the optoelectronic transceiver module.

In addition, once the top shell 104 is closed on the bottom shell 106, the first port 204 defined in the front piece 202 substantially secures the nose 130 of the TOSA 112 in an x-axis position and a y-axis position within the optoelectronic transceiver module 100. Similarly, the second port 206 defined in the front piece 202 substantially secures the nose piece 138 of the ROSA 114 in an x-axis position and a y-axis position within the optoelectronic transceiver module 100.

The OSA positioning device 200 can help secure the TOSA 112 and the ROSA 114 in accurate x, y, and z optical alignment with the output port 108 and the input port 110, respectively, and/or other components. In addition, the OSA positioning device 200 can help solve problems associated with gaps created as a result of manufacturing tolerances and stacking tolerances of components such as the rotatable top shell 104, the bottom shell 106, the TOSA 112, and the ROSA 114, for example. Further, as the optoelectronic transceiver module 100 is vibrated during assembly and use, the OSA positioning device 200 can help dampen the vibration, and thereby help to maintain the TOSA 112 and the ROSA 114 in an accurate x, y, and z optical alignment with the output port 108 and the input port 110, respectively. Moreover, the example OSA positioning device 200 disclosed herein can compensate for thermally-induced effects such as expansion/contraction of components of the optoelectronic transceiver module 100.

The example embodiments disclosed herein are to be considered in all respects only as illustrative and not restrictive.

What is claimed is:

1. An optical subassembly (OSA) positioning device comprising:
   a front piece defining a first port, the first port configured to receive and substantially secure a first OSA in an x-axis position and a y-axis position when the OSA positioning device is positioned within an optoelectronic module;
   a top back piece; and
   a top connector piece connecting the front piece and the top back piece, the top connector piece being deformable in response to an exerted force so as to bias a flange of the first OSA against a shell of the optoelectronic module such that the first OSA is further secured in a z-axis position when the OSA positioning device is positioned within the optoelectronic module.

2. The OSA positioning device as recited in claim 1, wherein the front piece and the top back piece are substantially parallel to each other.

3. The OSA positioning device as recited in claim 1, wherein:
   the front piece further defines a second port, the second port configured to receive and substantially secure a second OSA in an x-axis position and a y-axis position when the OSA positioning device is positioned within the optoelectronic module; and
   the top connector piece is deformable so as to bias a flange of the second OSA against a shell of the optoelectronic module such that the second OSA is secured in a z-axis position when the OSA positioning device is positioned within the optoelectronic module.

4. The OSA positioning device as recited in claim 1, further comprising:
   a bottom back piece; and
   a bottom connector piece connecting the front piece and the bottom back piece.

5. The OSA positioning device as recited in claim 4, wherein the bottom connector piece is deformable so as to bias a flange of the first OSA against a shell of the optoelectronic module such that the first OSA is further secured in a z-axis position when the OSA positioning device is positioned within the optoelectronic module.

6. The OSA positioning device as recited in claim 4, wherein the front piece and the bottom back piece are substantially parallel to each other.

7. The OSA positioning device as recited in claim 1, wherein the OSA positioning device is formed from sheet metal.

8. An OSA positioning device comprising:
   a front piece defining a transmitter optical subassembly (TOSA) port and a receiver optical subassembly (ROSA) port, the TOSA port configured to receive and substantially secure a TOSA in an x-axis position and a y-axis position when the OSA positioning device is positioned within an optoelectronic transceiver module, the ROSA port configured to receive and substantially secure a ROSA in an x-axis position and a y-axis position when the OSA positioning device is positioned within the optoelectronic transceiver module;
   a top back piece;
   a top connector piece connecting the front piece and the top back piece, the top connector piece being deformable so as to bias a flange of the TOSA and a flange of the ROSA against a shell of the optoelectronic module such that the TOSA and the ROSA are secured in a z-axis position when the OSA positioning device is positioned within the optoelectronic transceiver module;
   a bottom back piece; and
   a bottom connector piece connecting the front piece and the bottom back piece.

9. The OSA positioning device as recited in claim 8, wherein the front piece is substantially flat.

10. The OSA positioning device as recited in claim 9, wherein the top back piece is substantially flat.

11. The OSA positioning device as recited in claim 10, wherein the bottom back piece is substantially flat.

12. The OSA positioning device as recited in claim 11, wherein the front piece, the top back piece, and the bottom back piece are all substantially parallel to each other.

13. The OSA positioning device as recited in claim 8, wherein the OSA positioning device is formed from sheet metal.

14. The OSA positioning device as recited in claim 8, wherein the bottom connector piece is deformable so as to bias a flange of the TOSA and a flange of the ROSA against the shell of the optoelectronic module such that the TOSA and the ROSA is further secured in a z-axis position when the OSA positioning device is positioned within the optoelectronic transceiver module.

15. An optoelectronic transceiver module comprising:
   a shell comprising a top shell and a bottom shell, the bottom shell defining a slot, at least one of the top shell and/or the bottom shell defining a crimping rib;

a PCB at least partially positioned within the shell;

a TOSA electrically connected to the PCB, the TOSA defining a TOSA flange;

a ROSA electrically connected to the PCB, the ROSA defining a ROSA flange; and an OSA positioning device at least partially positioned within the slot, the OSA positioning device comprising:
- a front piece defining a TOSA port and a ROSA port, the TOSA port substantially securing the TOSA in an x-axis position and a y-axis position within the shell, the ROSA port substantially securing the ROSA in an x-axis position and a y-axis position within the shell;
- a top back piece;
- a top connector piece connecting the front piece and the top back piece,
- a bottom back piece; and
- a bottom connector piece connecting the front piece and the bottom back piece, wherein at least one of the top connector piece or the bottom connector piece includes a crimped portion associated with the crimping rib, the crimped portion serving to bias the TOSA flange and the ROSA flange against the shell such that the TOSA and the ROSA are secured in a z-axis position within the shell.

16. The optoelectronic transceiver module as recited in claim 15, wherein the front piece, the top back piece, and the top bottom piece are substantially parallel to each other.

17. The optoelectronic transceiver module as recited in claim 15, wherein the front piece, the top back piece, and the top bottom piece are each substantially flat.

18. The optoelectronic transceiver module as recited in claim 15, wherein each of the top connector piece and the bottom connector piece has a crimped portion associated with one of the crimping ribs, the crimped portions serving to bias the TOSA flange and the ROSA flange against the multi-piece shell such that the TOSA and the ROSA are further secured in a z-axis position within the multi-piece shell.

19. The optoelectronic transceiver module as recited in claim 15, wherein the OSA positioning device is formed from sheet metal.

20. The optoelectronic transceiver module as recited in claim 15, wherein the optoelectronic transceiver module is substantially compliant with a SFP+MSA.

* * * * *

UNITED STATES PATENT AND TRADEMARK OFFICE
CERTIFICATE OF CORRECTION

PATENT NO. : 7,476,039 B2
APPLICATION NO. : 12/038784
DATED : January 13, 2009
INVENTOR(S) : Moore It is certified that error appears in the above-identified patent and that said Letters Patent is hereby corrected as shown below:

The Title Page, showing an illustrative figure, should be deleted and substitute therefor the attached title page.

On the Title Page
Item 57, change "from" to --front--.

Drawings
Sheet 4, please replace Fig. 2A with the figure shown below, in which the second reference number 222 has been changed to 224.

Fig. 2A

Signed and Sealed this

Twelfth Day of October, 2010

David J. Kappos
*Director of the United States Patent and Trademark Office*

Column 3
Line 43, change "modules" to -- module--.

Column 5
Line 5, numbers "301" and "302" should not be in bold.

(12) United States Patent
Moore (10) Patent No.: US 7,476,039 B2
(45) Date of Patent: Jan. 13, 2009

(54) OPTICAL SUBASSEMBLY POSITIONING DEVICE FOR AN ELECTRONIC MODULE

(75) Inventor: Joshua Moore, Sunnyvale, CA (US)

(73) Assignee: Finisar Corporation, Sunnyvale, CA (US)

(*) Notice: Subject to any disclaimer, the term of this patent is extended or adjusted under 35 U.S.C. 154(b) by 0 days.

(21) Appl. No.: 12/038,784

(22) Filed: Feb. 27, 2008

(65) Prior Publication Data
US 2008/0205895 A1    Aug. 28, 2008

Related U.S. Application Data

(60) Provisional application No. 60/892,199, filed on Feb. 28, 2007.

(51) Int. Cl.
    G02B 6/42    (2006.01)
(52) U.S. Cl. .................................................. 385/92
(58) Field of Classification Search .................. None
    See application file for complete search history.

(56) References Cited

U.S. PATENT DOCUMENTS

| 6,744,639 | B1* | 6/2004 | Branch et al. ............ 361/818 |
| 2003/0171022 | A1* | 9/2003 | Distad et al. ............ 439/372 |
| 2004/0151443 | A1* | 8/2004 | Mizue ............ 385/92 |
| 2006/0140552 | A1* | 6/2006 | Mizue et al. ............ 385/92 |
| 2006/0215970 | A1* | 9/2006 | Mizue et al. ............ 385/92 |
| 2007/0189673 | A1* | 8/2007 | Yoshikawa ............ 385/53 |
| 2007/0237466 | A1* | 10/2007 | Togami et al. ............ 385/92 |

OTHER PUBLICATIONS

Moore, Joshua et al., Collar Clip for an Electronic Module, U.S. Appl. No. 12/038,689, filed Feb. 27, 2008.
Moore, Joshua et al., Positioning Plate for Optical Subassembly, U.S. Appl. No. 12/039,598, filed Feb. 28, 2008.
Moore, Joshua et al., Rotatable Top Shell, U.S. Appl. No. 12/039,677, filed Feb. 28, 2008.
Moore, Joshua et al, Printed Circuit Board Positioning Mechanism, U.S. Appl. No. 12/038,708, filed Feb. 27, 2008.
Moore, Joshua, Angular Seam for an Electronic Module, U.S. Appl. No. 12/038,721, filed Feb. 27, 2008.

* cited by examiner

Primary Examiner—Sung H Pak
Assistant Examiner—Mike Stahl
(74) Attorney, Agent, or Firm—Workman Nydegger (57) ABSTRACT

In one example embodiment, an optical subassembly (OSA) positioning device includes a front piece, a top back piece, and a top connector piece connecting the front piece and the top back piece, a bottom back piece, and a bottom connector piece connecting the front piece and the bottom back piece. The front piece defines a first port. The first port is configured to receive and substantially secure a first OSA in an x-axis position and a y-axis position when the OSA positioning device is positioned within an optoelectronic module. The top and bottom connector pieces are deformable in response to an exerted force so as to bias a flange of the first OSA against a shell of the optoelectronic module such that the first OSA is secured in a z-axis position when the OSA positioning device is positioned within the optoelectronic module.

20 Claims, 7 Drawing Sheets